United States Patent [19]

Zelli et al.

[11] 4,337,845
[45] Jul. 6, 1982

[54] TELESCOPIC ELEVATOR DEVICES IN PARTICULAR FOR DOLLIES

[76] Inventors: Sante Zelli; Salvatore Zelli, both of No. 15, Via Poggibonsi, 00148 Rome, Italy

[21] Appl. No.: 185,676

[22] Filed: Sep. 10, 1980

[30] Foreign Application Priority Data

Sep. 18, 1979 [IT] Italy .................................. 50287 A/79

[51] Int. Cl.³ .............................................. B66B 11/04
[52] U.S. Cl. ..................................... 187/17; 254/2 R; 254/93 R; 92/137
[58] Field of Search .................. 187/17, 9 E, 8.43, 23; 254/11, 93 R, 84, 86 H, 2 R, 2 B, 2 C; 92/137

[56] References Cited

U.S. PATENT DOCUMENTS 2,029,223  1/1936  Curtis ................................. 92/137
2,661,082  12/1953  Ziegler ............................... 187/17
2,840,347  6/1958  Fuecht ................................ 92/137
3,829,063  8/1974  Holzworth ......................... 254/93 R

*Primary Examiner*—Robert J. Spar
*Assistant Examiner*—Kenneth Noland
*Attorney, Agent, or Firm*—Young & Thompson

[57] ABSTRACT

The invention relates to a telescopic elevator device for dollies comprising in combination a wheel-mounted base member, a first extension member telescopically slidable on the base member, a second extension member telescopically mounted within the first extension member and apparatus for controlling the contemporaneous sliding of the extension members with respect to the base with a different speed so that the second extension member has a sliding speed which is the double of the first one.

3 Claims, 2 Drawing Figures

TELESCOPIC ELEVATOR DEVICES IN PARTICULAR FOR DOLLIES

This invention relates in general to those devices utilized in all the operations which involve problems of lifting and shifting apparatus like cinema cameras, television cameras, geodetic apparatus, sighting apparatus (telescopes, binoculars, range finders, etc.). Said devices besides moving themselves along the vertical axis with a variable speed, need brakes or blocking members for maintaining the position when they are locked at various heights, even if the apparatus anchored at the top have to rotate horizontally by means of suitable panoramic heads.

With the progress of cinematography, the requirements which are involved have become always more tight and the problem which has to be resolved in this field has become multiform and technically more difficult.

Let us consider, for example the problem caused by the shooting of a film, with shots which have to be made under difficult conditions, for example in the aisle of a railway car, between two cots in a barrack, in a trench passage, near the frame of a door of an attic, in narrow passages in an old castle, etc.

The purpose of the invention is to provide an apparatus which solves almost all the abovesaid problems.

According to this invention there is provided a dolly for cinema or television cameras having at the center a double stage telescopic column with simultaneous sliding of the two extensions by means of a differential positive transmission.

In the attached drawings, there have been represented schematically as an example two sections of a telescopic elevating device according to the invention having a triangular section, and particularly:

Figure 1:
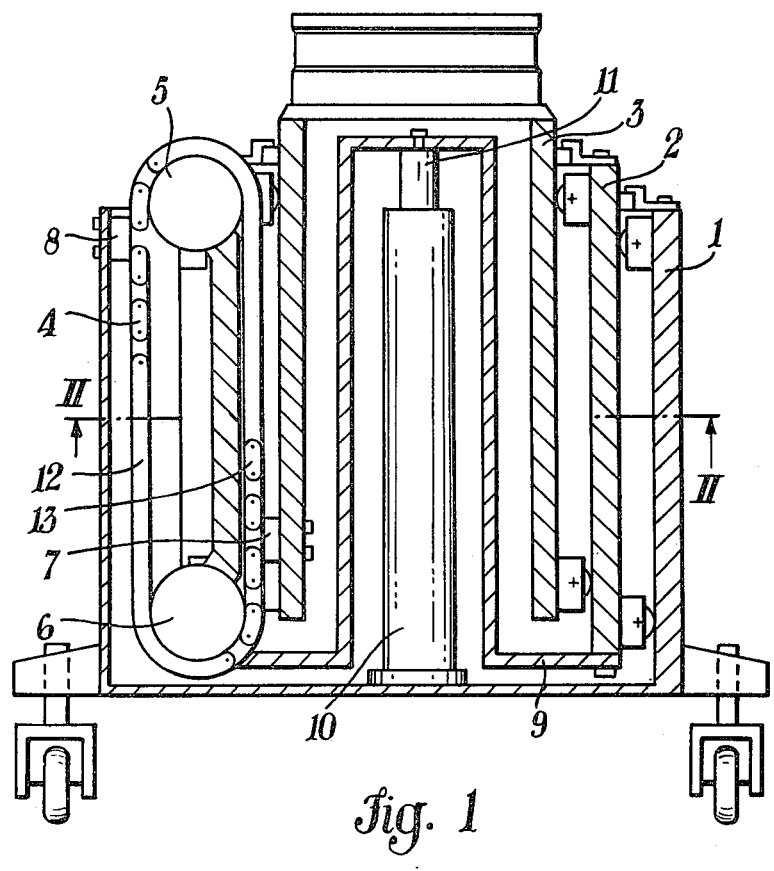
FIG. 1 shows a vertical section of the elevating device according to the plane I—I of FIG. 2.
Figure 2:
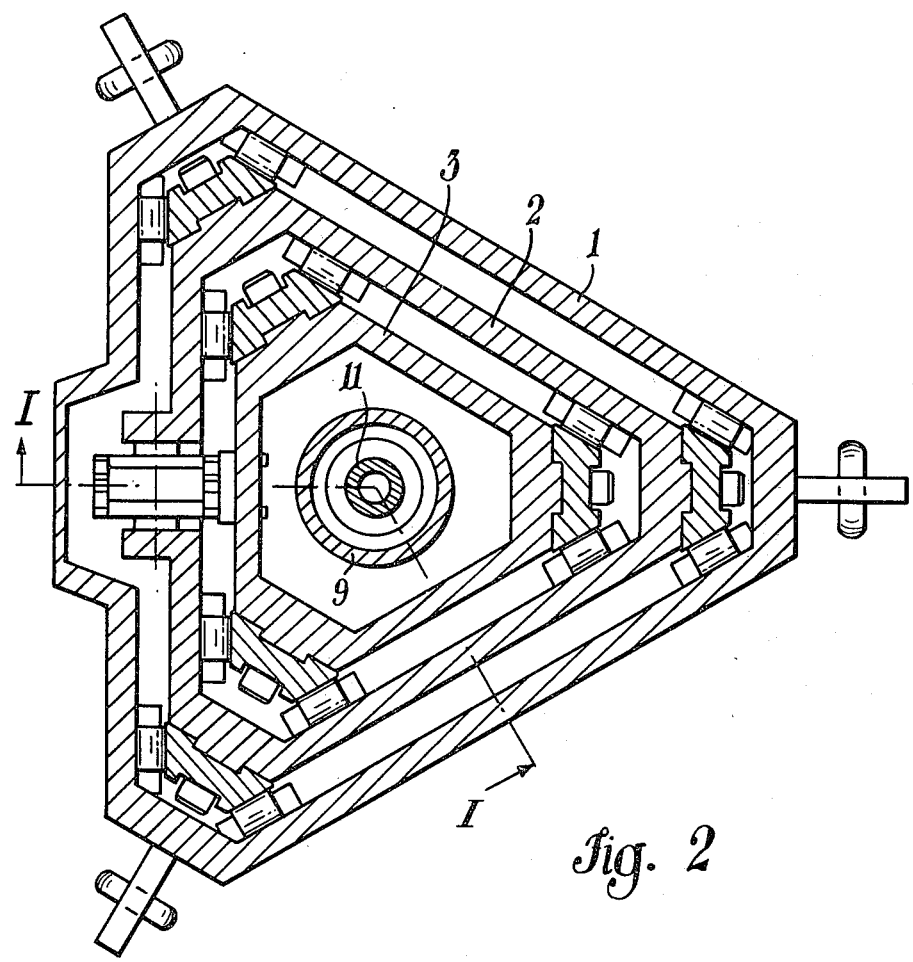
FIG. 2 shows a horizontal section according to the plane II—II of FIG. 1.

As it is shown in the drawing, the lifting device comprises a base 1 with wheels, a first extension member 2 and a second extension member 3. The chain loop in two parts 4 is kept taut between the two sprockets 5 and 6 fixed at the two ends of the extension member 2 and the two parts of the chain are anchored, respectively, the first 7 to the base of the extension member 3, and the second, 8, to the top of the base 1 where are located the means for the tensioning of the chain loop.

Now, if the hydraulic ram 11 of the cylinder 10 lifts the flanged tube 9 anchored to the extension member 2, this latter will rise with the same speed as the ram, whilst the extension member 3 rises at twice that speed thanks to the differential motion between the extension members 2 and 3.

It results therefore that the part of chain 13 anchored to the lower extremity 7 of the extension member 3, by passing around an idle roller 5 anchored on the tensioning means 8, will transmit a double speed to the extension member 3, similarly to what occurs in a lifting device with a movable sheave.

The section of the two extension members has a triangular shape and at the apices of the triangles there are mounted guides which slide in suitable bearings which ensure besides the sliding without play along the vertical axis of the system also the impossibility of any rotation or displacement around their axis.

The hydraulic system utilized for the lifting (not shown because known) is of the kind with an energy reserve.

Said system comprises an oil reservoir, a hydraulic accumulator fed by said reservoir, a flow regulator and a distributor. With a memory operated pump or an electrically driven pump oil is drawn from said reservoir and is sent to the hydraulic accumulator. The hydraulic accumulator, through the flow regulator feeds the three-way distributor, thereby to control the lifting speed of the ram 11, the stopping of the ram itself (stop-position) and the descent speed.

This invention has been disclosed with reference to a preferred embodiment, but it should be understood that modifications may be introduced in practice by a person skilled in the art without departing from the scope of the present claims.

What is claimed is:

1. A telescopic elevator device in particular for dollies for cinema or television, characterized in that it comprises, in combination, a wheel mounted base member, a first extension member telescopically slidable on said base, a second extension member telescopically mounted at the interior of the first extension member, and means for controlling simultaneous sliding of said extension members with respect to the base with a differential speed such that the sliding speed of the second extension member is the double of the sliding speed of the first extension member, said means for the sliding with differential speed comprising a chain transmission, passing over two sprockets fastened to the first extension member and having their rotation centers aligned on a straight line parallel to the axis of sliding of said extension members, the two rectilinear portions of said chain transmission being respectively connected with the upper end of the base member and with the lower end of said second extension member, the simultaneous sliding of the two telescopic extension members being controlled by a hydraulic ram operating on a tubular member concentric and coaxial with said extension members and said tubular members having at the base a flange rigidly connected with a base of said first extension member, said base and extension members being of triangular cross-sectional configuration.

2. A device according to claim 1, characterized in that the rotation centers of the two sprockets are spaced apart of an extent corresponding to the travel of said second extension member.

3. A device according to claim 1, characterized in that the base member and the extension members have equal sided sections that form said triangular cross-sectional configuration and provided with guide members and rolling bearings located at the apices of said triangle-shaped base and extension members, in order to guarantee a sliding without vibration and/or relative rotation.

* * * * *